United States Patent
Brachman et al.

(10) Patent No.: US 6,285,750 B1
(45) Date of Patent: Sep. 4, 2001

(54) METHOD AND APPARATUS FOR REMOTELY CONTROLLING TELEPHONE CALL-FORWARDING

(75) Inventors: Ronald J. Brachman, Westfield; Donnie Henderson, Manalapan; Lawrence David Jackel, Holmdel; Frederick Kenneth Schmidt, Jr., Califon, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/206,102

(22) Filed: Dec. 3, 1998

(51) Int. Cl.[7] .................................................. H04M 3/42
(52) U.S. Cl. ................................. 379/211.02; 379/207.15
(58) Field of Search ...................... 379/211.02, 212.01, 379/207.15, 201

(56) References Cited

U.S. PATENT DOCUMENTS

| | | | |
|---|---|---|---|
| 4,313,035 | * | 1/1982 | Soroan et al. ............... 379/211 X |
| 4,768,221 | * | 8/1988 | Green et al. ............... 379/211 X |
| 5,592,541 | * | 1/1997 | Fleischer et al. ................... 379/211 |
| 6,038,291 | * | 3/2000 | Cannon et al. ............... 379/211 X |

* cited by examiner

*Primary Examiner*—Creighton Smith
(74) *Attorney, Agent, or Firm*—Kenyon & Kenyon

(57) ABSTRACT

A call-forwarding system can be remotely controlled in a simple and easily understood manner, thereby increasing the usage of call-forwarding. By maintaining a registry of special telephone numbers for a user's telephone and, upon receiving a telephone call from one of the special telephone numbers, the system forwards calls to the one of the special telephone numbers. The call-forwarding system includes a registry of special telephone numbers and a call-forwarding controller which, upon receiving a call from one of the special telephone numbers, forwards calls to the one of the special telephone numbers. In addition, the call-forwarding controller includes a caller-ID application which identifies all incoming telephone calls and passes this information to the controller. The controller then compares the incoming call to the telephone numbers in the registry and, upon obtaining a match, activates a routine for forwarding future incoming calls to the matched telephone number. The above method of controlling call-forwarding of an office telephone from a remote telephone provides the end user a very simple interface to allow remote enabling and disabling of call-forwarding.

37 Claims, 4 Drawing Sheets

METHOD AND APPARATUS FOR REMOTELY CONTROLLING TELEPHONE CALL-FORWARDING

BACKGROUND OF THE INVENTION

The present invention relates generally to methods and apparatuses for automatically forwarding telephone calls, and more particularly to a method and apparatus for automatically forwarding telephone calls under remote control.

Many office workers spend a sizable portion of their day outside their base office or away from their office telephone. For example, workers may be at other locations within their office building, outside their office building at remote sites, or in transit between sites. In all cases, there is often a need to stay "connected" with the office telephone system, having the ability to remotely receive calls that would normally go to the office phone. Call-forwarding is a common telephony service that attempts to address this need.

Today, call-forwarding is typically provided as a telephone system service by the local office/building PBX or by the telephony central office. The most basic operation is that a user can somehow signal this telephony "controller" and cause calls going to their office phone to be redirected to another phone number.

In one typical system, an office worker activates call-forwarding by entering a sequence of button presses on the keypad and/or button set of their office telephone. This button press sequence usually includes call-forwarding on/off codes and a "forward-to" number. Operationally, one normally activates call-forwarding just before leaving one's office and similarly disables call-forwarding upon returning to the office.

Existing systems enable remote control of call-forwarding as well. For example, one remotely controlled call-forwarding system requires a user to dial into a special service number that is associated with the telephony control system for their office phone. Next, the user enters required PIN codes, forwarding on/off codes, forward-to numbers, etc., using the touch-tone pad of the phone from which the user is calling. As a result, the user is able to remotely control the forwarding of the user's telephone calls from another telephone.

Pac-Bell and Bell-Atlantic currently offer a variety of similar call-forwarding services. In one mode of operation, there are systems that provide a "follow-me" service. These systems attempt to keep in touch with a user by calling the user's phone(s) based on a pre-defined availability schedule, or by sequentially calling all phones the user has registered with the service. There is usually a voice mail drop in case the call is not answered at all.

Each of the above systems work well, but they all require the user to enter a complex sequence of codes or button-presses. Many users find this difficult to perform, and consequently do not regularly forward their telephones, which makes the overall goal of call-forwarding impossible to achieve. Call-forwarding is intended to make employees of a company reachable at almost all times. If the employees are not willing to use the system, however, the company has paid for a service it is not using and for which it is not receiving value. In today's competitive environment, most companies will not continue to pay for services that do not add value.

The present invention is therefore directed to the problem of developing a call-forwarding system that can be remotely controlled in a simple and easily understood manner, thereby increasing the usage of call-forwarding.

SUMMARY OF THE INVENTION

The present invention solves this problem by maintaining a list or registry of special telephone numbers for a user's telephone and, upon receiving a telephone call from one of the special telephone numbers, forwarding calls to the one of the special telephone numbers.

According to the present invention, a system for performing the method of the present invention includes a registry of special telephone numbers and a call-forwarding controller which, upon receiving a call from one of the special telephone numbers, forwards calls to the one of the special telephone numbers.

According to another aspect of the present invention, the call-forwarding controller includes a caller-ID application which identifies all incoming telephone calls and passes this information to the controller. In this case, the controller then compares the incoming call to the telephone numbers in the registry and, upon obtaining a match, activates a routine for forwarding future incoming calls to the matched telephone number.

According to another aspect of the present invention, the system includes a user interface device that enables the user to enter telephone numbers into the list via the user's touch-tone telephone. This same interface device enables the user to specify a duration during which the call-forwarding will remain activated. If the user fails to specify a duration, the system uses default duration to deactivate call-forwarding. Examples of default durations include an end of a workday, an end of a work week, a beginning of a workday, a beginning of a work week, midnight, and five o'clock in the morning.

According to yet another aspect of the present invention, the system includes a timer that is activated upon activating the call-forwarding, which timer deactivates the call-forwarding when the timer reaches a predetermined time.

According to yet another aspect of the present invention, an incoming call from one of the special telephone numbers changes a state of the call-forwarding, such as from ON to OFF, or from OFF to ON. Upon changing the state, the system transmits a special tone sequence to the user, which uniquely identifies the current state.

According to yet another aspect of the present invention, an apparatus for enabling remote control of call-forwarding from a remote telephone includes: means for enabling a user to enter a list of special telephone numbers into a database via the user's telephone; means for identifying an originating telephone number of an incoming call; means for comparing the originating telephone number to the special telephone numbers in the list; means for forwarding future incoming calls upon receiving a match from the means for comparing to the originating telephone number; and means for deactivating the means for forwarding upon expiration of a predetermined time interval.

DETAILED DESCRIPTION

The present invention provides user-friendly call-forwarding control service based on available telephony and computing resources using caller-ID for inbound phone calls, which is a known application that requires no further description herein, and an application and/or service that allows a user to register a list of phone numbers from which an inbound call can trigger a special action for their office phone. A telephone number in this registry will be referred to as a "Authorized Action Phone Number" (AAPN). In addition, the system of the present invention includes an application or service that performs the actual signaling (touch-tone pad presses/button presses) required to activate/ deactivate call-forwarding, etc., for the user's office phone. Herein, this application will be referred to as the signaling application, which can easily be implemented on an office/ central office PBX, etc.

Figure 1:
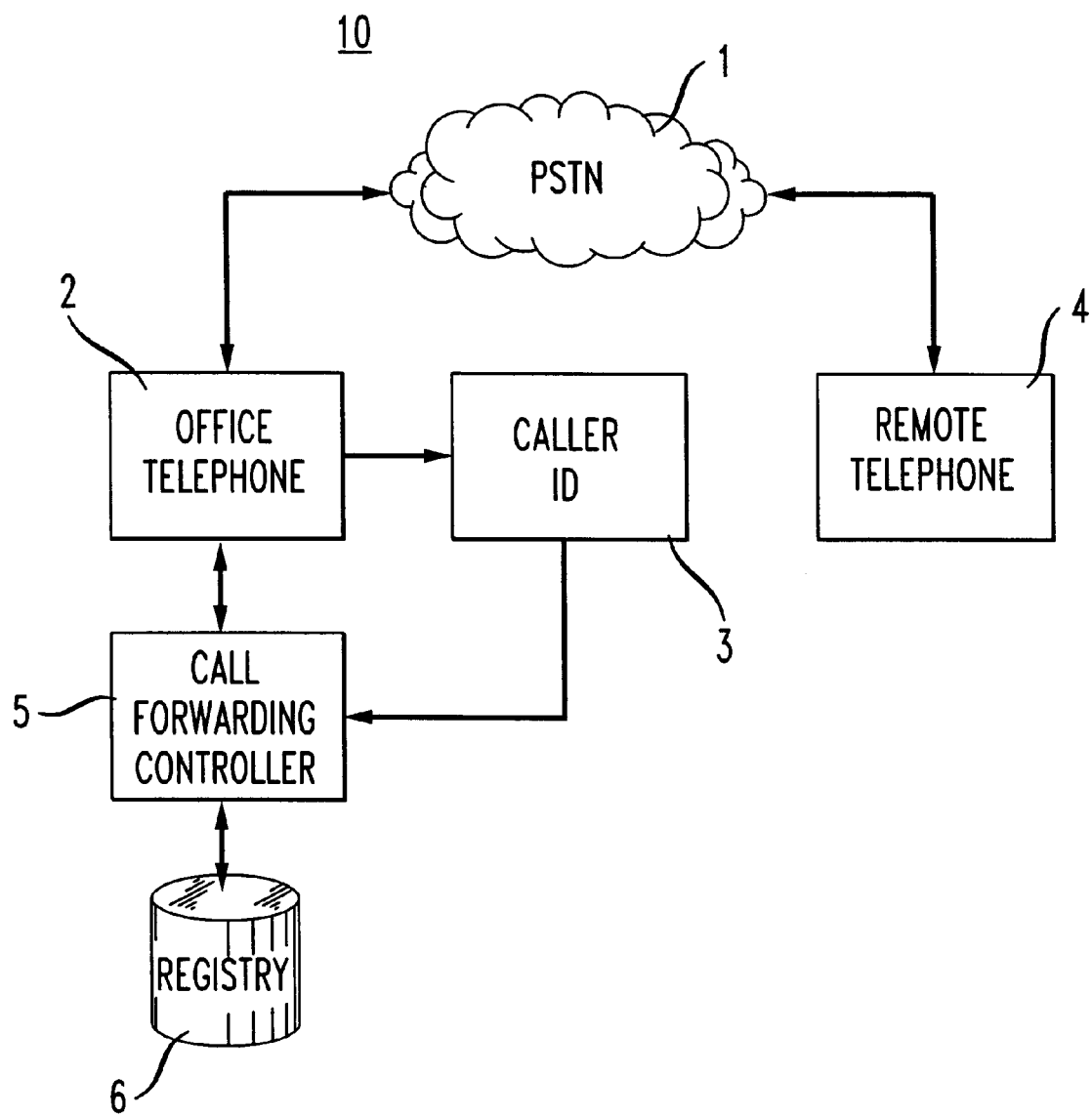
FIG. 1 depicts one exemplary embodiment of the system according to the present invention.

FIG. 1 depicts one exemplary embodiment of the system of the present invention. An office telephone 2 is coupled to the Public Switched Telephone Network (PSTN) 1, to which a remote telephone 4 is also coupled. The office telephone 2 has a caller-ID device 3 and a call-forwarding controller 5 coupled to it. The controller 5 has a database storing a registry 6 of telephone numbers.

The auto-call-forwarding service of the present invention operates as follows. A given office telephone 2 and a remote telephone 4 will be referred to as P1 and P2 respectively. The system 10 of the present invention includes an application or a service 5 capable of receiving inbound call status from P1. That is, the application knows when a call is coming in for P1 and it receives caller-ID information for all inbound calls. The application or service 5 is also capable of controlling P1, i.e., performing functions such as dialing, hangup, activating/deactivating call-forwarding, etc. The system 10 of the present invention also includes a registry 6 (or database) containing one or more telephone numbers. An incoming call from any of these telephone numbers is considered authorized to affect P1. (These telephone numbers are referred to as AAPNs above.)

Operation

First, when P1 is called from P2, the application or service 5 obtains the caller-ID associated with P2 and attempts to validate the caller-ID against the registry's AAPN entries. If authorization succeeds, call-forwarding is activated such that future calls to P1 are immediately redirected to P2. This call-forwarding stays in effect for a predetermined time interval. The user, via an interface to the forwarding control application or service, sets the time interval.

Assuming auto-call-forwarding service is running on a user's office telephone system, and the user's cellular (or remote phone number) is registered with this service, if the user calls their office phone from their cellular phone, then call-forwarding of the office phone will be activated such that all inbound calls will be redirected to the user's cellular phone. Call-forwarding will be automatically turned off or "timed out" after a user-specified time period, such as the end of the work day, end of the work week, etc. The system could also include a default time, such as midnight, at which time the system would disable all call-forwarding unless instructed to the contrary.

The present invention is a simple, genuinely useful means of controlling call-forwarding. It fits especially well in the scenario where there is one office phone per user, and the user calls some number other than their office phone number to access voice mail, etc., and the user wishes their office phone to be forwarded to the remote phone they are currently using.

According to the present invention, the logic is that the user would never be calling their own office phone from their cellular phone, for example, unless they desired some special action to be taken by their office telephone system. Most importantly, this auto-call-forwarding service allows a user to control forwarding of phone calls without pressing any buttons or entering any PIN codes, etc.

Variations are possible. In an exemplary embodiment, an AT&T ISDN phone is linked to a desktop PC, which is running the application of the present invention. When the office phone rings, the application of the present invention obtains caller-ID information. Because the application of the present invention has been previously set up to turn on call-forwarding as described above, the application of the present invention validates the caller-ID and sends a message to the office telephone to activate call-forwarding. Next, the application of the present invention initiates a countdown timer. When the timer expires, the application of the present invention disables call-forwarding of the office telephone.

Another scenario is possible utilizing the capabilities of the local PBX. In this case, a service will be created where the user can toggle his/her call-forwarding on/off. The concept of the present invention is similar to the above, but has a few differences. When the service receives a call from an AAPN, if call-forwarding is currently OFF for the office phone, call-forwarding will be toggled ON. The application of the present invention will then chime two touch-tones to indicate call-forwarding has been activated. The service then hangs up. If the call-forwarding state was changed from ON to OFF, the user will hear a single touch-tone indication. In this case, the system might still use a countdown timer to disable call-forwarding automatically after some longer time period, in case the user has forgotten to turn off call-forwarding. Toggling of the service applies equally to all of the embodiments discussed herein.

Another variation according to the present invention includes system detection of touch-tones once the user's caller-ID has been validated, enabling call-forwarding if the user presses "1" or disabling call-forwarding if the user presses "0", for example. Other possible embodiments include use of the "#" symbol or the "*" symbol.

Figure 2:
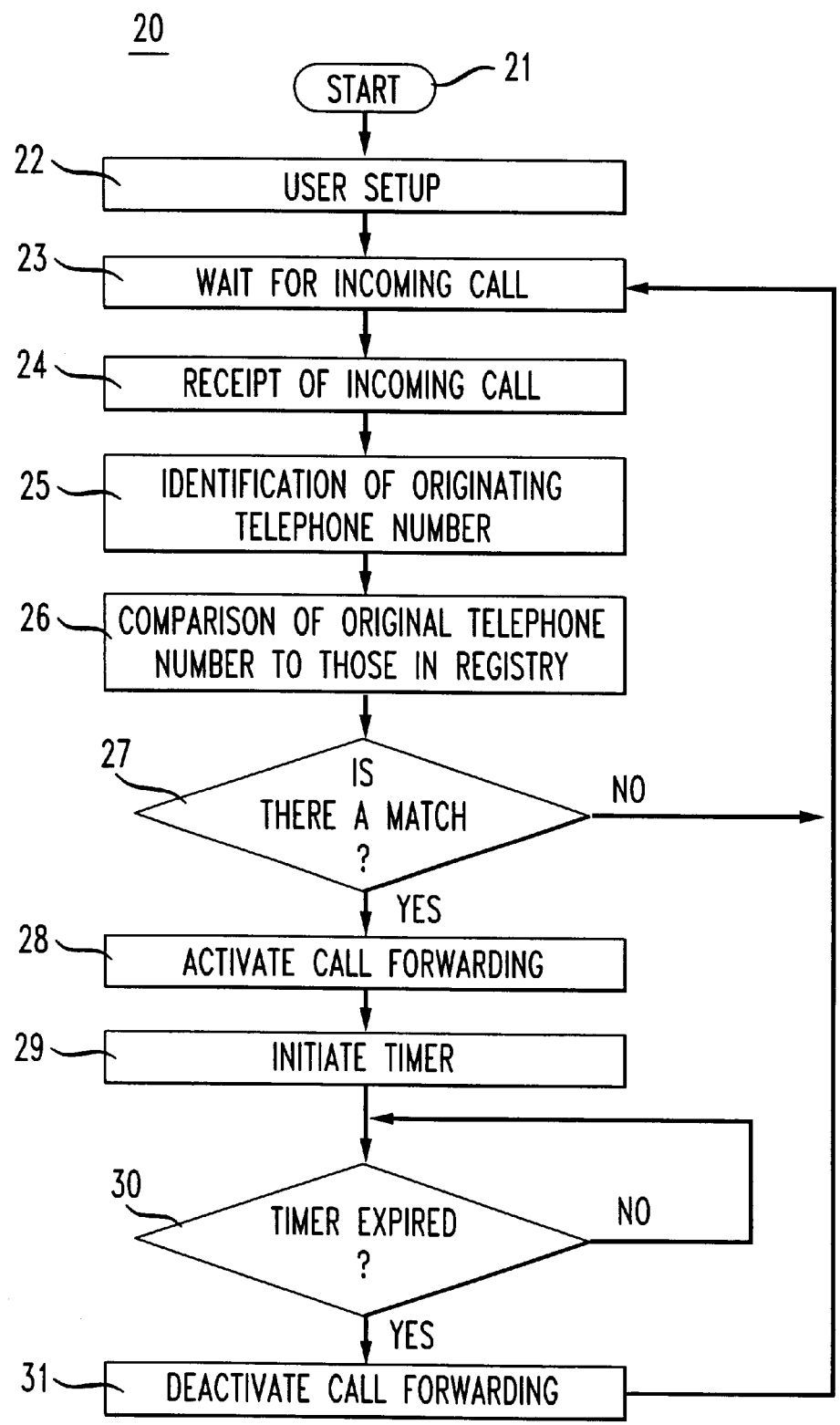
FIG. 2 depicts an exemplary embodiments of the method according to the present invention.

FIG. 2 depicts an exemplary embodiment of the method according to the present invention. The method starts at step 21. First, the user sets up the system by entering the special telephone numbers into the registry (step 22). This is accomplished using a touch-tone interface menu system that prompts the user to enter a PIN, and then provides a series of menu choices which are selectable by pressing one of the buttons on a touch tone telephone keypad, for example. One menu choice would be to enter the registry of telephone numbers and then to add to the list. The interface system would then ask the user for the number to add, which the user keys in using the same touch-tone keypad. Deleting entries is also possible, and can be accomplished by selecting the menu choice for deleting entries. after which the system will "read" the entries. By selecting some predetermined button, such as the "#" key, the user can delete the entry that was just "read" by the system. The same user interface enables the user to enter a duration for the call-forwarding so that the user does not need to deactivate the call-forwarding each time the user returns to the office telephone area. Once the system is set up, the process moves to step 23.

In step 23, the process waits for an incoming call. Upon receipt of an incoming call in step 24, the process moves to step 25, during which the originating telephone number is identified using caller-ID. The process then moves to step 26.

In step 26, the process compares the originating telephone number to the list of special numbers in the registry. Upon detecting a match (step 27), the process moves to step 28.

In step 28, the system activates call-forwarding by transmitting the proper dialing sequence according to the user's specific call-forwarding system. While each system is unique, they are by no means complicated. The controller transmits the known sequence, which is predetermined. If there is no match, the telephone rings and the call is processed as normal, and then the process returns to step 23 to wait for the next incoming call. After step 28, the process moves to step 29.

In step 29, the process initiates a timer based on the duration discussed above. In step 30, the process checks to see if the timer has expired and, if so, the process moves to step 31 and deactivates call-forwarding, which is again accomplished by transmitting a predetermined dialing sequence to the office telephone for transmission to the local operating company. If the timer has not yet expired, the process simply waits and rechecks the timer. After deactivation, the process returns to step 23 and waits for an incoming call.

Figure 3:
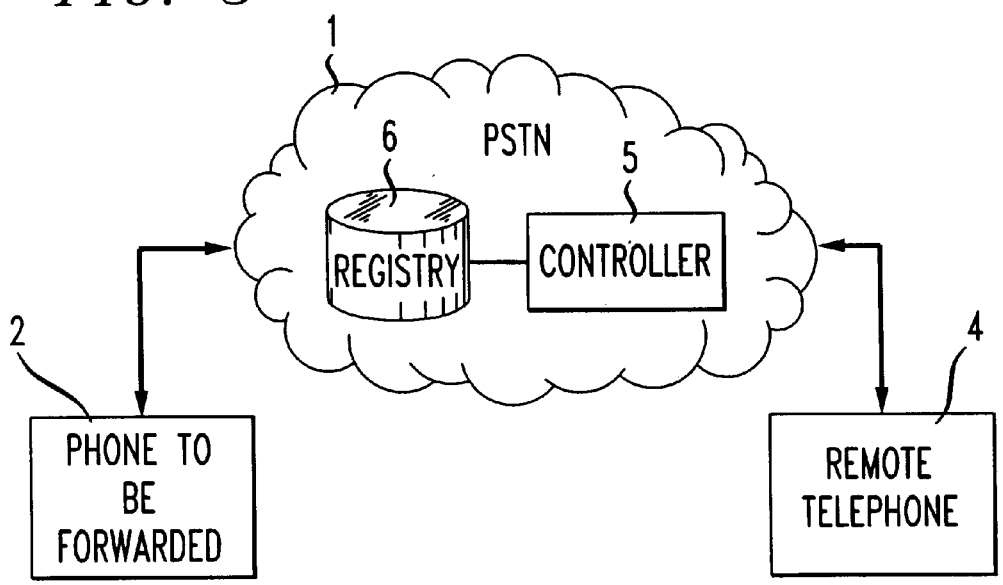
FIGS. 3–6 depict various embodiments of the present invention.

FIG. 3 depicts another exemplary embodiment 10 of the present invention. In this embodiment, the telephone to be forwarded 2 (which could be either an office telephone or a home telephone), is coupled to the PSTN 1 in the normal manner. Within the PSTN 1 is a registry 6 and a call-forwarding controller 5. The remote telephone 4 is coupled to the PSTN 1 in the normal manner. As in the above embodiment, when the call-forwarding controller becomes aware that a call was placed from the remote telephone 4 to the telephone to be forwarded 2, the call-forwarding controller 5 checks the database to determine whether the incoming call to telephone 2 is from an AAPN and, if so, redirects all future calls to remote telephone 4. The call-forwarding controller 5 becomes aware of calls to telephone 2 either through switching signals or by calls routed through the call-forwarding controller, depending upon the exact implementation of the PSTN 1 in use, e.g., SS7 or POTS.

Figure 4:
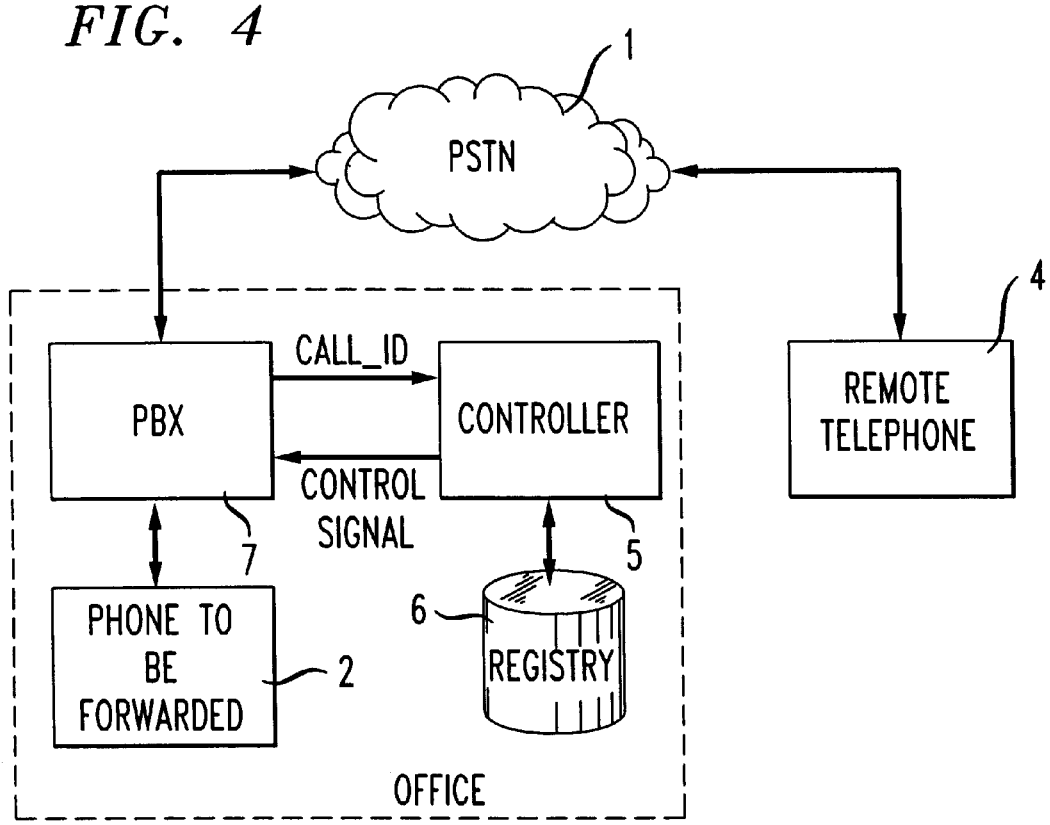

FIG. 4 depicts yet another exemplary embodiment 11 of the present invention. In this embodiment, the telephone to be forwarded 2 is coupled to a PBX 7, which is coupled to the PSTN 1 in the normal manner. The remote telephone 4 is also coupled to the PSTN 1 in the normal manner. In this case, the call-forwarding controller 5 is located somewhere within the office complex and is coupled to the PBX 7. The registry 6 is also coupled to the call-forwarding controller 5 as before. Caller-ID signals and control signals flow between the call-forwarding controller 5 and the PBX 7. In this case, the call-forwarding controller 5 is shown as an adjunct to the PBX 7, however, it could also be implemented in the PBX 7. As before, the call-forwarding controller 5 determines whether to forward future telephone calls to telephone 2 depending upon the signals received from PBX 7.

Figure 5:
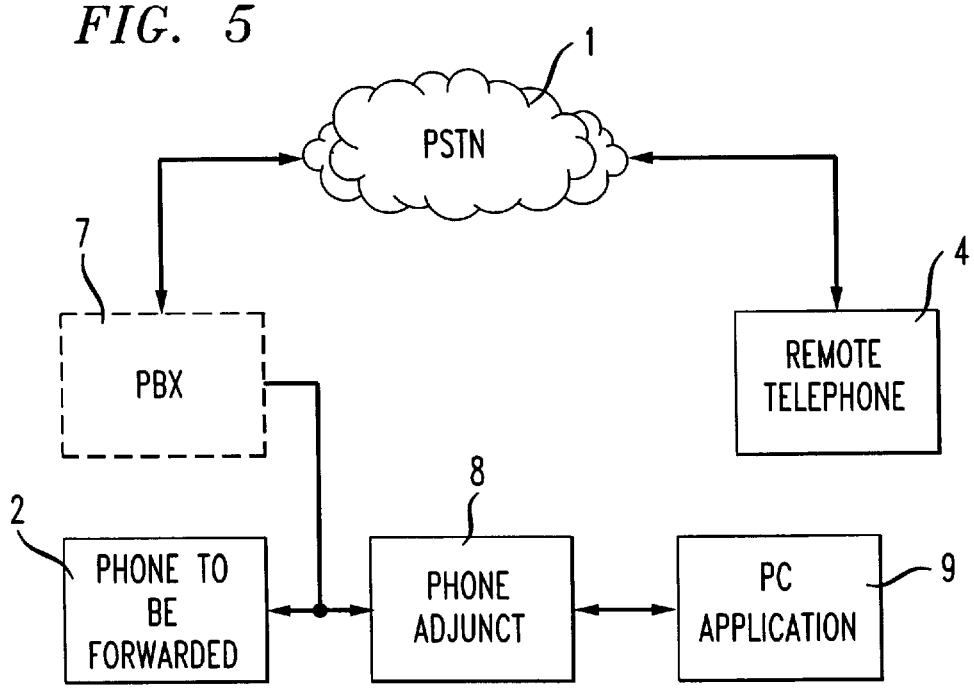

FIG. 5 depicts yet another exemplary embodiment 12 of the present invention. In this case, the telephone to be forwarded 2 can either be coupled through a PBX 7 to the PSTN 1 or directly to the PSTN 1 (i.e., there is no PBX 7). The remote telephone 4 is coupled in the normal manner to the PSTN 1. Coupled to the telephone 2 is a phone adjunct 8, which performs caller-ID functions. Coupled to the phone adjunct 8 is a personal computer 9 executing an application 13 that implements the registry 6 and the call-forwarding intelligence of the call-forwarding controller 5. The application 13 determines whether or not to cause the adjunct 8 to signal the PBX or the PSTN to set or disable call-forwarding.

Figure 6:
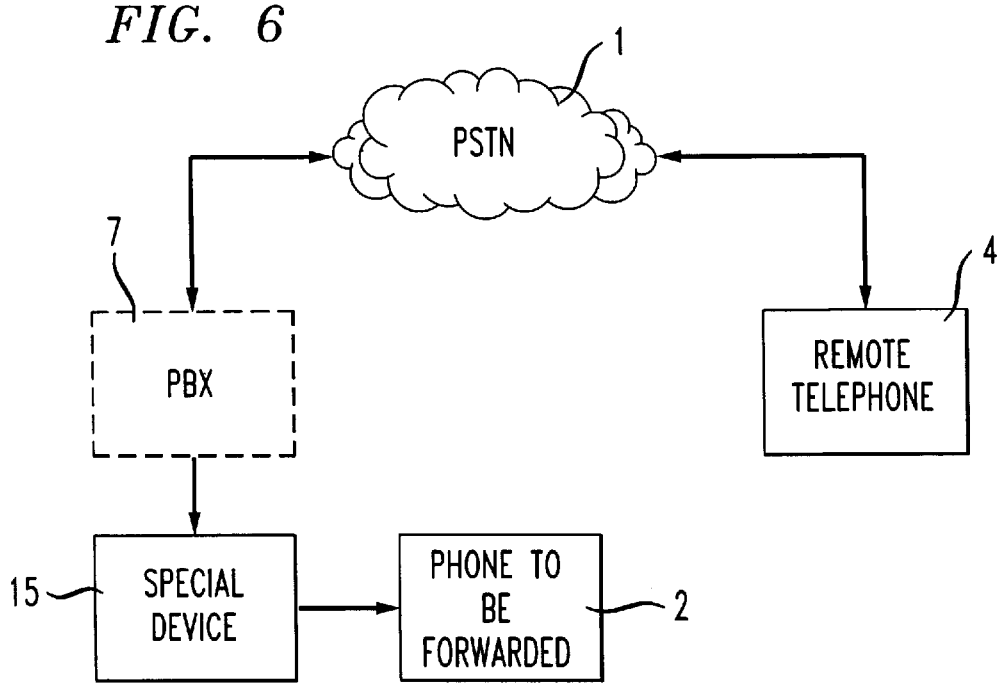

FIG. 6 depicts yet another exemplary embodiment 14 of the present invention. In this case, the telephone to be forwarded 2 can either be coupled through a PBX 7 to the PSTN 1 or directly to the PSTN 1 (i.e., there is no PBX 7). The remote telephone 4 is coupled in the normal manner to the PSTN 1. Coupled to the telephone 2 and between the PBX 7 or PSTN 1 is a special device 15 that implements the registry 6 and call-forwarding control 5, as well as the caller-ID detection. The special device 15 includes a serial port interface to allow users to program their registry entries and other options. A network interface could be included to allow remote configuration and management of the special device 15. In this case, the personal computer of FIG. 5 is not required in this configuration.

Call-forwarding is one of the most essential and useful telephone service features for today's office worker. The present invention provides a service for making call-forwarding easier to use and more approachable for the typical user, consequently increasing the likelihood that more office workers will activate their call-forwarding when leaving their work space. The method of the present invention has applications in local office telephone systems as well as in larger service offerings such as those offered by Pac-Bell and Bell Atlantic. In fact, similar easy-to-use telephony services could prove as attractive in residential markets as in the office.

What is claimed is:

1. A method for remotely controlling call-forwarding of incoming calls, comprising the steps of:

maintaining a list of special telephone numbers;

determining an originating telephone number upon receiving an incoming call from one of the special telephone numbers in the list; and forwarding all future incoming calls, upon receiving said incoming call from the special telephone number, to said special telephone number.

2. The method according to claim 1, further comprising the step of comparing the originating telephone number to all of the special telephone numbers in the list.

3. The method according to claim 2, further comprising the step of activating the call-forwarding upon determining that the originating telephone number matches one of the special telephone numbers in the list.

4. The method according to claim 1, further comprising the steps of:

activating a timer upon activating the call-forwarding; and deactivating the call-forwarding when the timer reaches a predetermined time.

5. The method according to claim 1, further comprising the step of changing a state of the call-forwarding upon receiving a call from one of the special telephone numbers in the list.

6. A method for remotely controlling call-forwarding of incoming calls, comprising the steps of:

maintaining a list of special telephone numbers, wherein said maintaining a list includes entering a plurality of telephone numbers into the list; and forwarding all future incoming calls, upon receiving a call from one of the special telephone numbers in the list, to said one of the special telephone numbers.

7. The method according to claim 6, further comprising the step of entering a duration during which the call-forwarding will remain activated.

8. The method according to claim 7, further comprising the step of using a default duration to deactivate call-forwarding if a user fails to specify a duration.

9. The method according to claim 8, wherein the default duration includes one selected from the following: an end of a workday, an end of a work week, a beginning of a workday, a beginning of a work week, midnight, and five o'clock in the morning.

10. A system for remotely controlling call-forwarding of incoming calls comprising:

a memory storing a registry of special telephone numbers;

a controller coupled to the memory, and forwarding all future incoming calls, upon receipt of a call from one of the special telephone numbers in the registry, to said one of the special telephone numbers in the registry; and a caller-ID device determining an originating telephone number upon receiving an incoming call and sending the originating telephone number to the controller;

wherein the controller compares the originating telephone number with the special telephone numbers in the registry.

11. The system according to claim 10, wherein the controller, upon determining that the originating telephone number matches one of the special telephone numbers in the registry, activates the call-forwarding to the originating telephone number.

12. The system according to claim 10, further comprising a timer activated by the controller upon activating the call-forwarding, wherein the timer reaches a predetermined time, the timer signals the controller, which deactivates the call-forwarding.

13. A system for remotely controlling call-forwarding of incoming calls comprising:

a memory storing a registry of special telephone numbers;

a controller coupled to the memory, and forwarding all future incoming calls, upon receipt of a call from one of the special telephone numbers in the registry, to said one of the special telephone numbers in the registry; and a user interface device to enable a user to enter at least one telephone number into the registry, wherein the user interface device enables the user to specify a duration of the call-forwarding.

14. The system according to claim 13, wherein the controller uses a default duration to deactivate call-forwarding if the user fails to specify a duration.

15. They system according to claim 14, wherein the duration includes one selected from the following: an end of a workday, an end of a work week, a beginning of a workday, a beginning of a work week, midnight, and five o'clock in the morning.

16. An apparatus for enabling remote control of call-forwarding from a remote telephone comprising:

a) means for enabling a user to enter special telephone numbers into a registry in a database via the user's telephone;

b) means for identifying an originating telephone number of an incoming call;

c) means for comparing the originating telephone number to the special telephone numbers in the registry;

d) means for forwarding future incoming calls upon receiving a match from said means for comparing to the originating telephone number; and e) means for deactivating the means for forwarding upon expiration of a predetermined time interval.

17. An apparatus for automatically forwarding future telephone calls to a remote telephone from a first telephone, comprising:

a) a caller identification device coupled to the first telephone and outputting caller identification signals;

b) a memory storing a registry of special telephone numbers; and c) a controller coupled to the memory and the caller identification device, receiving the caller identification signals from the caller identification device, determining whether a calling number matches one of special telephone numbers in the registry, and forwarding all future incoming calls, upon receipt of a call from one of the special telephone numbers in the registry to said one of the special telephone numbers in the registry.

18. An apparatus for automatically forwarding future telephone calls to a remote telephone from a first telephone, comprising:

a) a memory disposed in a telephone network and storing a registry of special telephone numbers; and b) a controller disposed in the telephone network, coupled to the memory, receiving caller identification signals from the telephone network, determining whether a calling number matches one of special telephone numbers in the registry, and forwarding all future incoming calls, upon receipt of a call from one of the special telephone numbers in the registry to said one of the special telephone numbers in the registry.

19. An apparatus for automatically forwarding future telephone calls to a remote telephone from a first telephone, comprising:

a) a private exchange disposed within a user's location, coupled to the first telephone and outputting caller identification signals;

b) a memory for storing a registry of special telephone numbers; and c) a call-forwarding controller coupled to the memory and the private exchange, receiving the caller identification signals from the private exchange, determining whether a calling number matches one of special telephone numbers in the registry, and forwarding all future incoming calls, upon receipt of a call from one of the special telephone numbers in the registry to said one of the special telephone numbers in the registry.

20. The apparatus according to claim 19, wherein the memory and the call-forwarding controller are disposed within the private exchange.

21. An apparatus for automatically forwarding future telephone calls to a remote telephone from a first telephone, comprising:

a) a phone adjunct coupled to the first telephone and a telephone network, and outputting caller identification signals; and b) a personal computer executing an application and storing a registry of special telephone numbers, wherein said personal computer receives the caller identification signals from the phone adjunct, said application determines whether a calling number matches one of special telephone numbers in the registry, and controls the adjunct, which in turn forwards all future incoming calls, upon receipt of a call from one of the special telephone numbers in the registry to said one of the special telephone numbers in the registry.

22. An apparatus for automatically forwarding future telephone calls to a remote telephone from a first telephone, comprising:

a) a private exchange disposed in a user's facility; and b) a device coupled to the private exchange, the first telephone and the remote telephone via a telephone network, said device storing a registry of special telephone numbers, determining a telephone number of an incoming call, determining whether said telephone number of the incoming call matches one of a plurality of special telephone numbers in the registry, and controlling all future incoming calls so that they are forwarded to said remote telephone upon receipt of a call from one of the special telephone numbers in the registry.

23. A method of providing remote control of call-forwarding comprising:

receiving an incoming call that is directed to a called telephone;

identifying an originating telephone number of the incoming call;

determining that the originating telephone is on a list of telephone numbers;

receiving future incoming calls that are directed to said called telephone; and forwarding said future incoming calls to said originating telephone number.

24. The method of claim 23, further comprising deactivating said forwarding upon expiration of a predetermined time interval.

25. The method according to claim 23, wherein said forwarding is enabled upon receiving a predetermined first special signal.

26. The method according to claim 25, wherein said forwarding is disabled upon receiving a predetermined second special signal.

27. The method according to claim 25, wherein the first special signal includes a predetermined touch tone on a tone pad.

28. An article of manufacture comprising a computer-readable medium having stored thereon instructions adapted to be executed by a processor, the instructions which, when executed, cause the processor to:

receive an incoming call that is directed to a called telephone;

identify an originating telephone number of the incoming call;

determine that the originating telephone is on a list of telephone numbers;

receive future incoming calls that are directed to said called telephone; and forward said future incoming calls to said originating telephone number.

29. The article of manufacture of claim 28, wherein said instructions further comprise instructions to deactivate said forwarding upon expiration of a predetermined time interval.

30. The article of manufacture of claim 28, wherein said instructions further comprise instructions to enable said forwarding upon receiving a predetermined first special signal.

31. The article of manufacture of claim 30, wherein said instructions further comprise instructions to disable said forwarding upon receiving a predetermined second special signal.

32. The article of manufacture of claim 31, wherein the first special signal includes a predetermined touch tone on a tone pad.

33. An apparatus for providing remote control of call-forwarding comprising:

a means for receiving an incoming call that is directed to a called telephone;

a means for identifying an originating telephone number of the incoming call;

a means for determining that the originating telephone is on a list of telephone numbers;

a means for receiving future incoming calls that are directed to said called telephone; and a means for forwarding said future incoming calls to said originating telephone number.

34. The apparatus of claim 33, further comprising a means for deactivating said forwarding upon expiration of a predetermined time interval.

35. The apparatus of claim 33, further comprising a means to enable said forwarding upon receiving a predetermined first special signal.

36. The apparatus of claim 35, further comprising a means to disable said forwarding upon receiving a predetermined second special signal.

37. The apparatus of claim 35, wherein the first special signal includes a predetermined touch tone on a tone pad.

* * * * *